(12) United States Patent
Wilson (10) Patent No.: US 12,259,049 B2
(45) Date of Patent: Mar. 25, 2025

(54) CHALK BOX WITH IMPROVED ONE-WAY VALVE

(71) Applicant: APEX BRANDS, INC., Apex, NC (US)

(72) Inventor: Cecil Wilson, Sanford, NC (US)

(73) Assignee: APEX BRANDS, INC., Apex, NC (US)

( * ) Notice: Subject to any disclaimer, the term of this patent is extended or adjusted under 35 U.S.C. 154(b) by 505 days.

(21) Appl. No.: 17/618,950

(22) PCT Filed: Jun. 11, 2020

(86) PCT No.: PCT/US2020/037183
§ 371 (c)(1),
(2) Date: Dec. 14, 2021

(87) PCT Pub. No.: WO2020/257042
PCT Pub. Date: Dec. 24, 2020

(65) Prior Publication Data
US 2022/0268367 A1    Aug. 25, 2022

Related U.S. Application Data

(60) Provisional application No. 62/862,219, filed on Jun. 17, 2019.

(51) Int. Cl.
*B44D 3/38*      (2006.01)
*F16K 15/14*    (2006.01)

(52) U.S. Cl.
CPC ............ *F16K 15/1471* (2021.08); *B44D 3/38* (2013.01)

(58) Field of Classification Search
CPC ............................. F16K 15/1471; B44D 3/38
See application file for complete search history.

(56) References Cited

U.S. PATENT DOCUMENTS 3,888,010 A * 6/1975 Hyde ...................... B44D 3/38
242/405
3,957,078 A     5/1976 Hlinsky
(Continued)

FOREIGN PATENT DOCUMENTS

CN          1162517 A       10/1997
CN        102430198 A        5/2012
(Continued)

OTHER PUBLICATIONS

Second Examination Report issued in corresponding Australian Application No. 2020296817 on Oct. 16, 2023, all enclosed pages cited.

(Continued)

*Primary Examiner* — Yaritza Guadalupe-Mccall
(74) *Attorney, Agent, or Firm* — BURR & FORMAN LLP (57) ABSTRACT

A chalk port for retaining chalk within a chalk reservoir of a chalk box may include an interface portion configured to interface with a housing of the chalk box to retain the chalk port in contact with the chalk box, a tapered portion extending away from the interface portion in an axial direction, and a slit assembly disposed at the tapered portion. The tapered portion may have a diameter that reduces as distance from the interface portion increases. The tapered portion may include a plurality of projections separated from each other by slits of the slit assembly. The projections may have a rest (Continued)

position configured to bias the slit assembly closed. Ribs may be formed to extend between the interface portion and the projections to bias the projections to the rest position.

20 Claims, 9 Drawing Sheets

(56) References Cited

U.S. PATENT DOCUMENTS

| | | | |
|---|---|---|---|
| 4,565,011 A | 1/1986 | Karger | |
| 5,644,852 A | 7/1997 | Fuller et al. | |
| 6,098,299 A | 8/2000 | Collins et al. | |
| 7,197,831 B2 | 4/2007 | Nepil | |
| 10,071,594 B2* | 9/2018 | Chernyshou | B44D 3/38 |
| 10,507,689 B2* | 12/2019 | Nosek | B44D 3/38 |
| 11,807,034 B2* | 11/2023 | Wilson | B44D 3/38 |
| 11,897,280 B2* | 2/2024 | Wilson | B44D 3/38 |
| 2006/0037980 A1* | 2/2006 | Nepil | B44D 3/38 33/414 |
| 2010/0179480 A1 | 7/2010 | Sugiki et al. | |
| 2015/0190570 A1* | 7/2015 | Teoh | A61M 39/0613 29/428 |
| 2016/0167425 A1* | 6/2016 | Chernyshou | B44D 3/38 106/31.01 |
| 2016/0347117 A1* | 12/2016 | Parker | B44D 3/38 |
| 2018/0065404 A1* | 3/2018 | Khangar | B44D 3/38 |
| 2022/0185006 A1* | 6/2022 | Wilson | B44D 3/38 |
| 2022/0268367 A1* | 8/2022 | Wilson | B44D 3/38 |
| 2024/0166491 A1* | 5/2024 | Anthony | B67D 1/0804 |

FOREIGN PATENT DOCUMENTS

| | | | | |
|---|---|---|---|---|
| CN | 114007871 A | | 2/2022 | |
| CN | 114007872 A | * | 2/2022 | B44D 3/38 |
| DE | 102013020864 A1 | | 6/2015 | |

OTHER PUBLICATIONS

Office Action from Chinese Application No. 202080044193.4 mailed on Mar. 2, 2022, all pages cited in its entirety.
First Examination Report issued in corresponding Australian Application No. 2020296817 on Nov. 4, 2022, all 1 enclosed pages cited.
Decision of Rejection issued in corresponding Chinese Application No. 202080044193.47 on Jan. 5, 2023, all enclosed pages cited.
International Search Report and Written Opinion from International Application No. PCT/US2020/037183 mailed Sep. 17, 2020, all pages cited in its entirety.

* cited by examiner

CHALK BOX WITH IMPROVED ONE-WAY VALVE

TECHNICAL FIELD

Example embodiments generally relate to a chalk box or chalk reel, and more particularly relate to a chalk box or chalk reel having an improved one-way valve.

BACKGROUND

A chalk box (sometimes referred to as a chalk reel or chalk line tool) is a tool for marking straight lines on surfaces. To accomplish this, the chalk box typically includes a string or line that may be made of nylon, cotton or other materials and is able to be wound or spooled up onto a reel assembly. The string is exposed to chalk (or another marking substance) within the tool. The string typically has an end hook at one end, and the end hook extends from a body of the tool. The end hook can be pulled, thereby extracting string from the reel assembly, to place the end hook at a first point that is distant from a second point near which the remainder of the tool will be retained. Alternatively, the end hook could be affixed to the first point and the remainder of the tool can be moved to the second point while withdrawing string from the reel assembly. In either case, the end hook retains the string at the first point, and the user may pull the string relatively tightly to the second point (e.g., holding the string at the second point with the user's hand or thumb). The user may then pluck or snap the string sharply, and the chalk may be transferred to the surface to mark a straight line between the first and second points. The marked line is often referred to as a chalk line and, after its formation, the user often operates a rotatable handle that is operably coupled to the reel assembly to retract the string back onto the reel or drum thereof.

The process described above, and the tool adapted for performing the process, are both very old. Most chalk boxes utilize a chalk-port via which a chalk container (or chalk bottle) can be used to refill the chalk level within the chalk box. The chalk-port can be formed in many different ways. For example, some chalk-ports may employ fill-doors, quarter-turn interlocking nozzles, rubber valves or the like. Generally, the chalk-ports tend to require at least one user action to open the chalk-port prior to the insertion of the chalk bottle nozzle. However, more recently, efforts have been made to incorporate a one-way valve (i.e., a valve that allows movement in only one direction) into chalk boxes. These conventional one-way valve designs suffer from leakage problems and do not self-seal very well, thereby leading to excessive leakage.

BRIEF SUMMARY OF SOME EXAMPLES

Some example embodiments may enable the provision of a chalk box that has an improved one-way valve design, which enables the chalk box to be easily refilled while also having an improved egress rating and less leakage. Some example embodiments may also have increased life cycles due to reduced fatigue on the valve port area.

In an example embodiment, a chalk box (also known as a chalk reel or chalk line tool) is provided. The chalk box may include a housing having an aperture, a reel assembly enclosed within the housing, a string having a first end operably coupled to an end hook and configured to extend from the housing through the aperture and having a second end configured to be wound on the reel assembly, a chalk reservoir in which the string is retained or through which the string passes prior to extending out of the aperture, and a chalk port. The chalk port may include an interface portion configured to interface with a housing of the chalk box to retain the chalk port in contact with the chalk box, a tapered portion extending away from the interface portion in an axial direction, and a slit assembly disposed at the tapered portion. The tapered portion may have a diameter that reduces as distance from the interface portion increases. The tapered portion may include a plurality of projections separated from each other by slits of the slit assembly. The projections may have a rest position configured to bias the slit assembly closed. Ribs may be formed to extend between the interface portion and the projections to bias the projections to the rest position.

In another example embodiment, a chalk port for retaining chalk within a chalk reservoir of a chalk box is provided. The chalk port may include an interface portion configured to interface with a housing of the chalk box to retain the chalk port in contact with the chalk box, a tapered portion extending away from the interface portion in an axial direction, and a slit assembly disposed at the tapered portion. The tapered portion may have a diameter that reduces as distance from the interface portion increases. The tapered portion may include a plurality of projections separated from each other by slits of the slit assembly. The projections may have a rest position configured to bias the slit assembly closed. Ribs may be formed to extend between the interface portion and the projections to bias the projections to the rest position.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Figure 1:
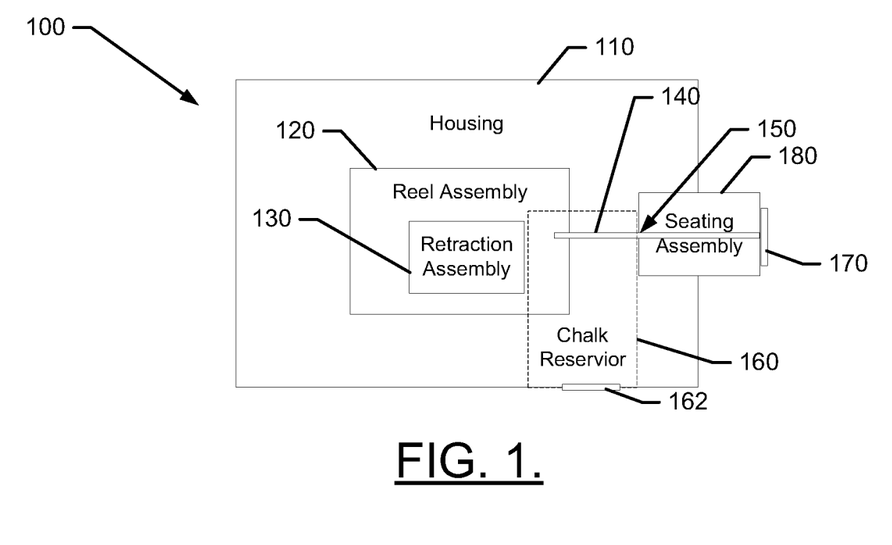
FIG. 1 illustrates a block diagram of a chalk box in accordance with an example embodiment.
Figure 2:
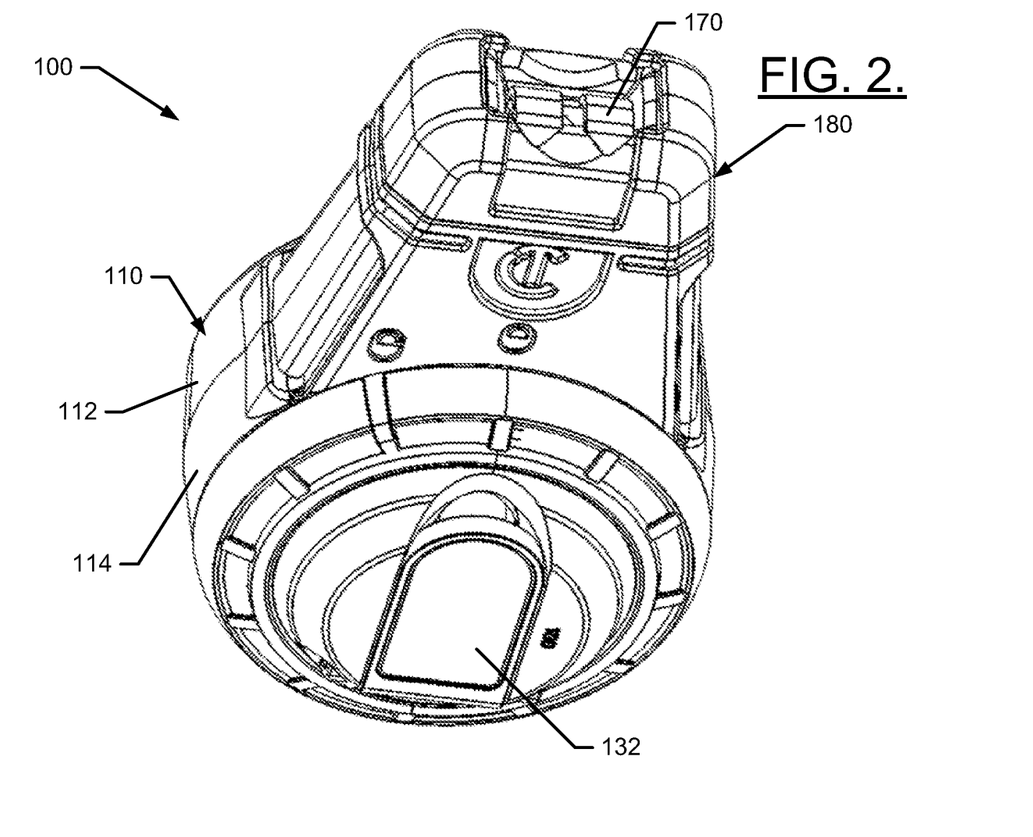
FIG. 2 illustrates a front perspective view of the chalk box in accordance with an example embodiment.
Figure 3:
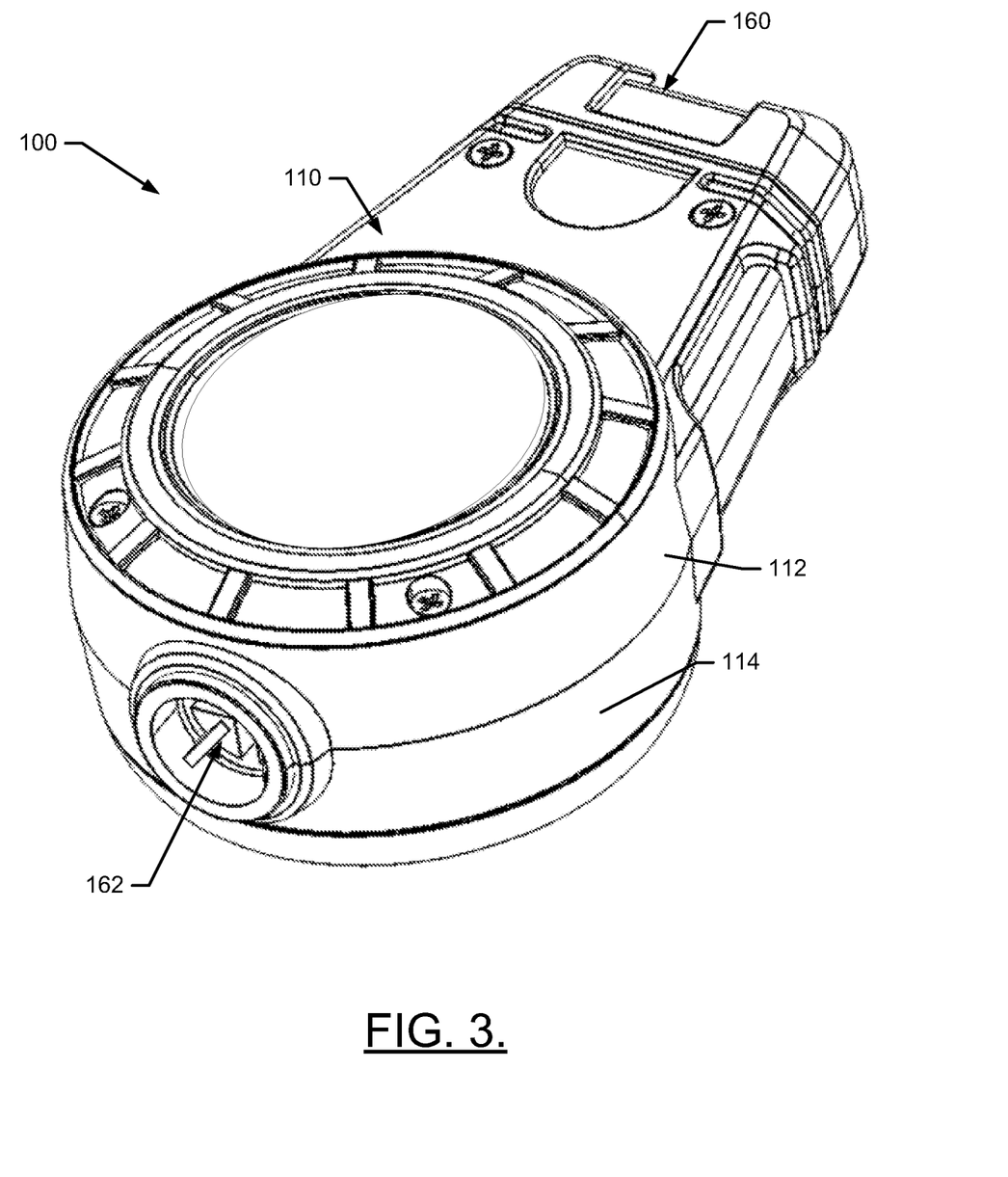
FIG. 3 illustrates a rear perspective view of the chalk box in accordance with an example embodiment.
Figure 4:
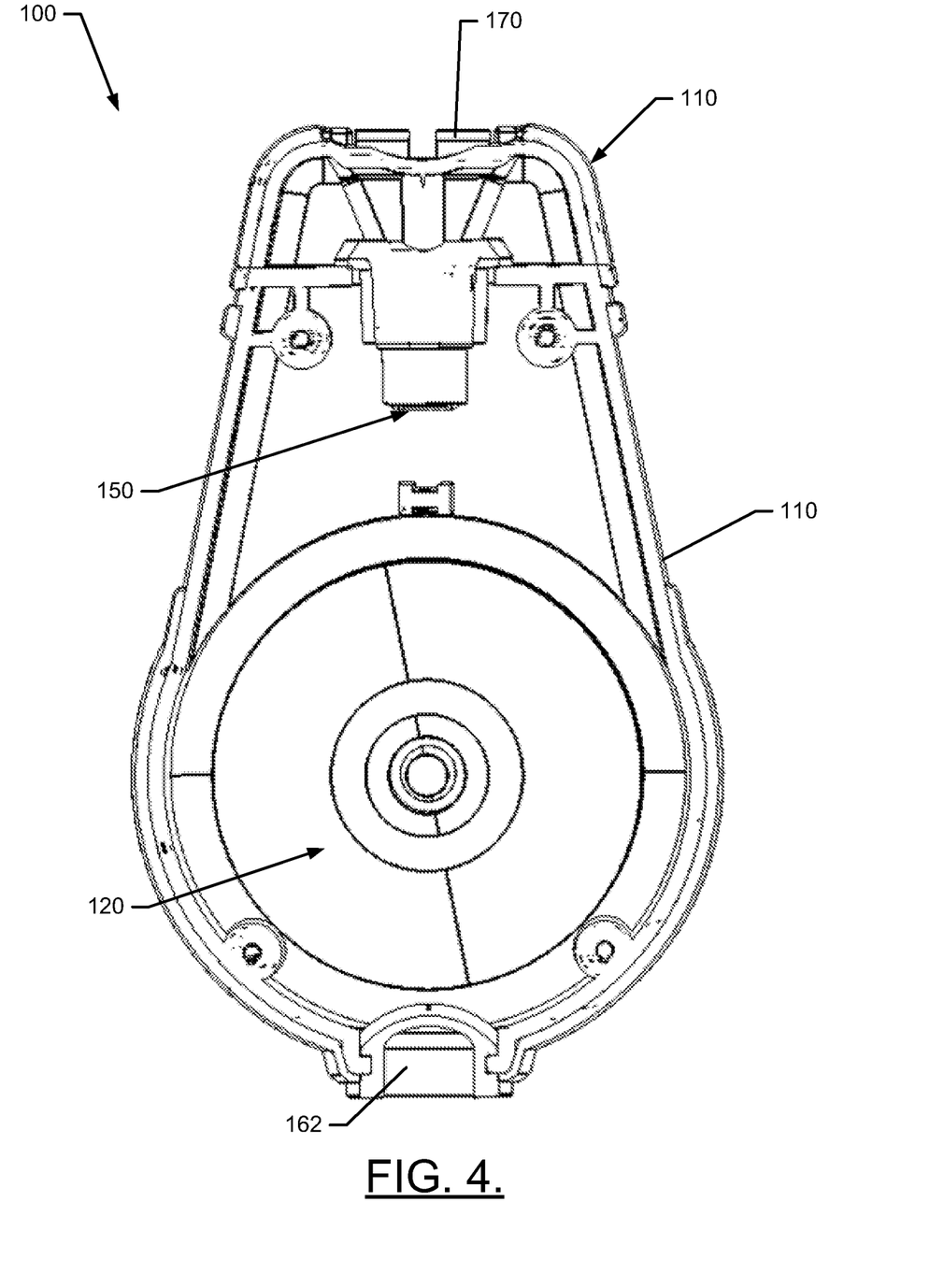
FIG. 4 illustrates a cross section view taken along a plane passing through the intersection between case halves of the chalk box in accordance with an example embodiment.
Figure 5:
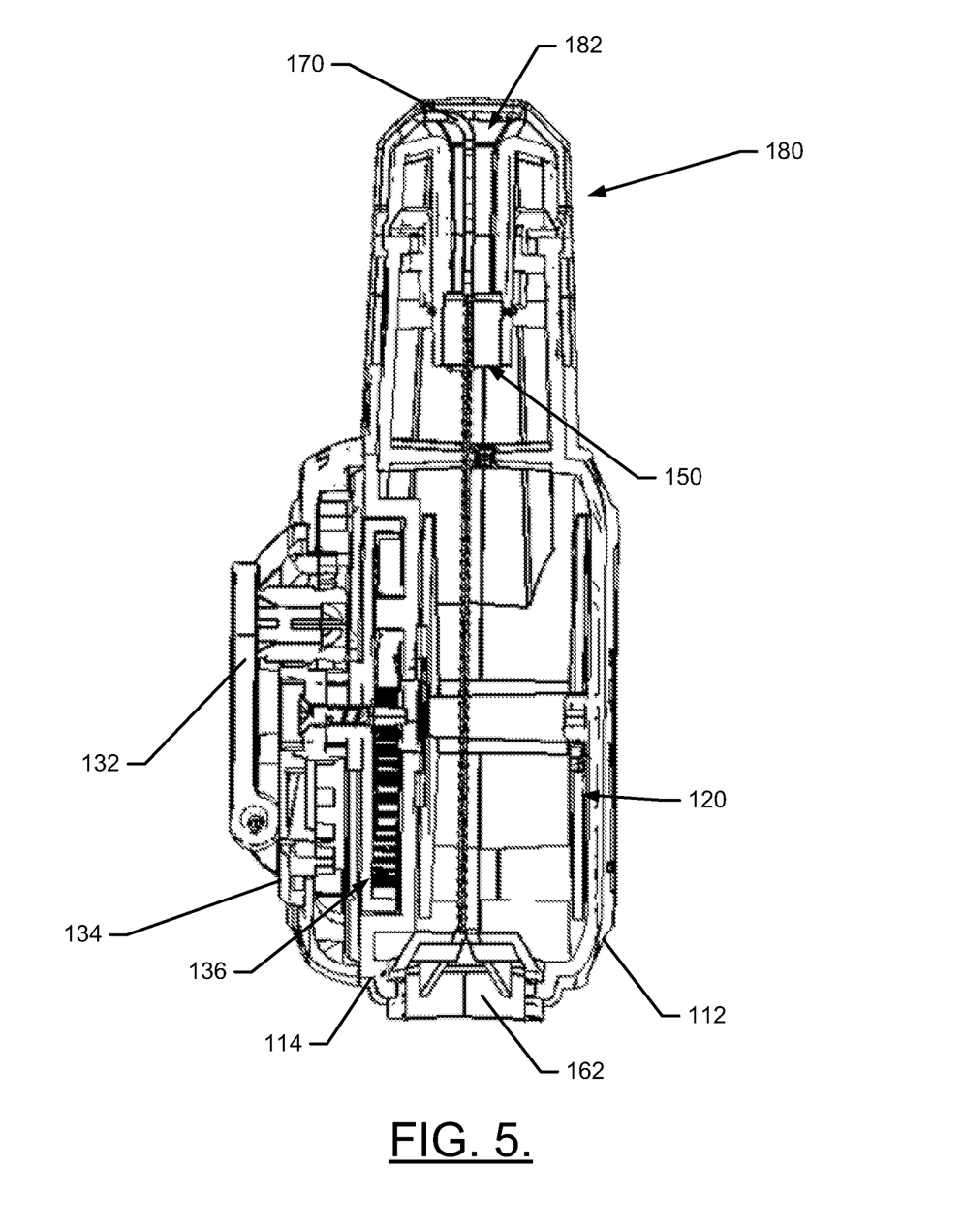
FIG. 5 is a cross section view taken along a longitudinal centerline of the chalk box via a plane that is perpendicular to the plane mentioned above in reference to FIG. 4 in accordance with an example embodiment.
Figure 6A:
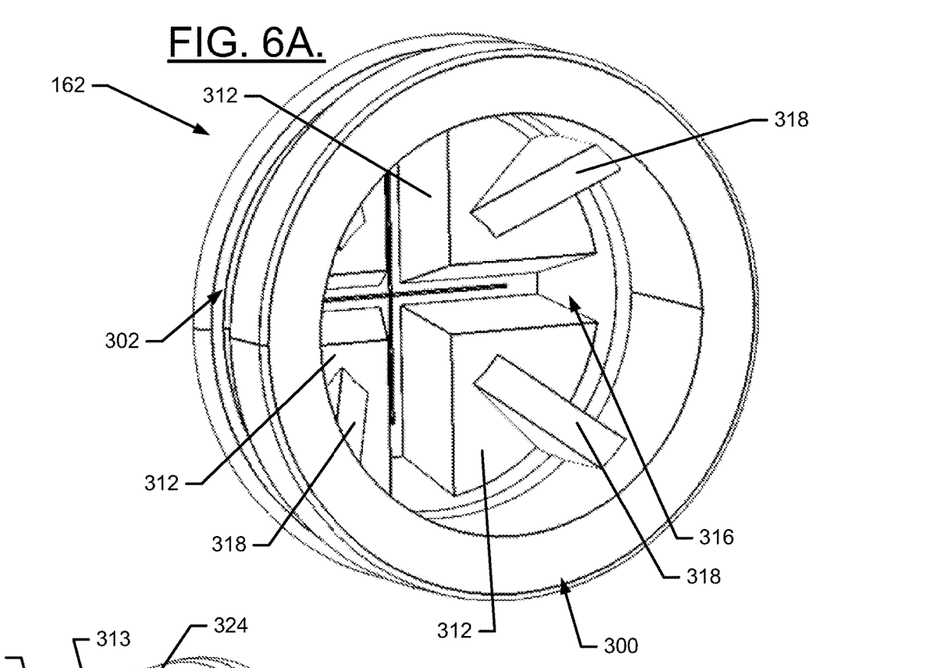
FIG. 6A is a front perspective view of a chalk port in isolation in accordance with an example embodiment.
Figure 6B:
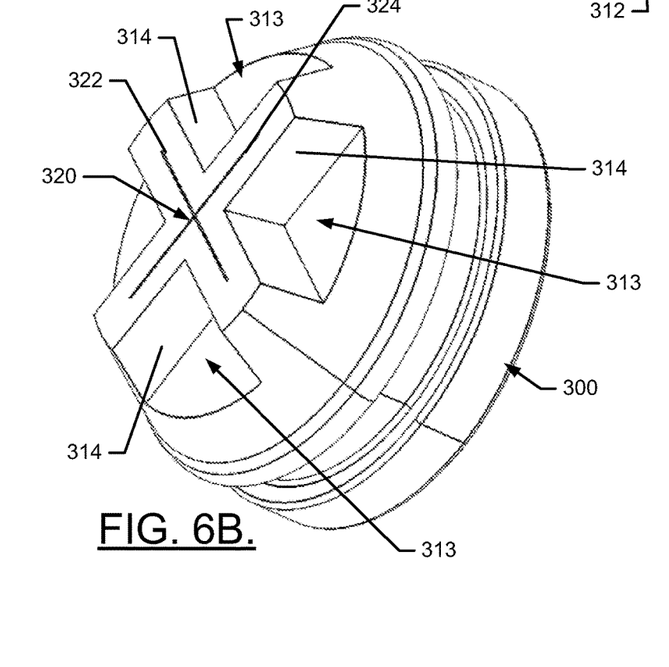
FIG. 6B is a rear perspective view of the chalk port in accordance with an example embodiment.
Figure 6C:
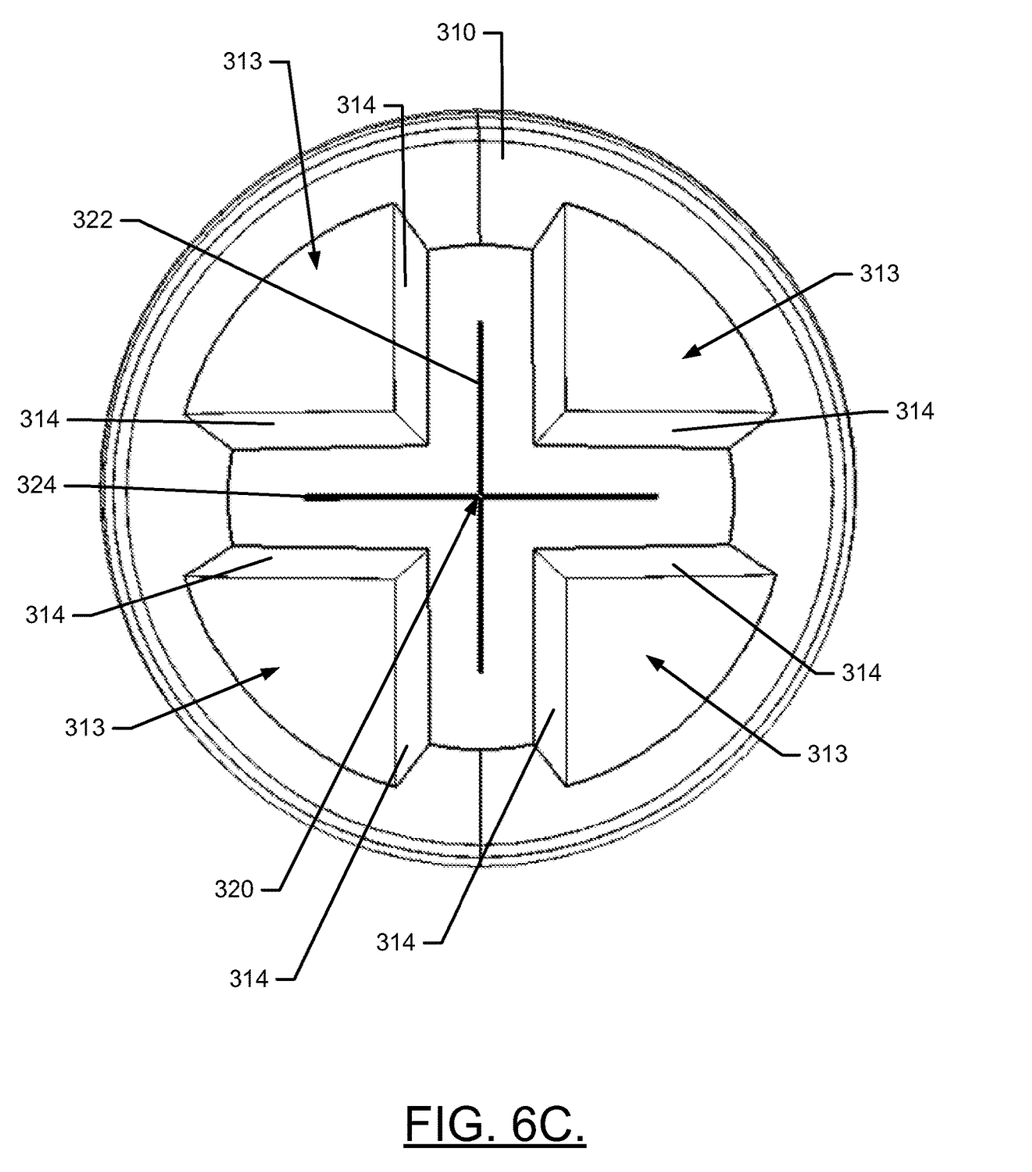
FIG. 6C is a front view of the chalk port in accordance with an example embodiment.
Figure 6D:
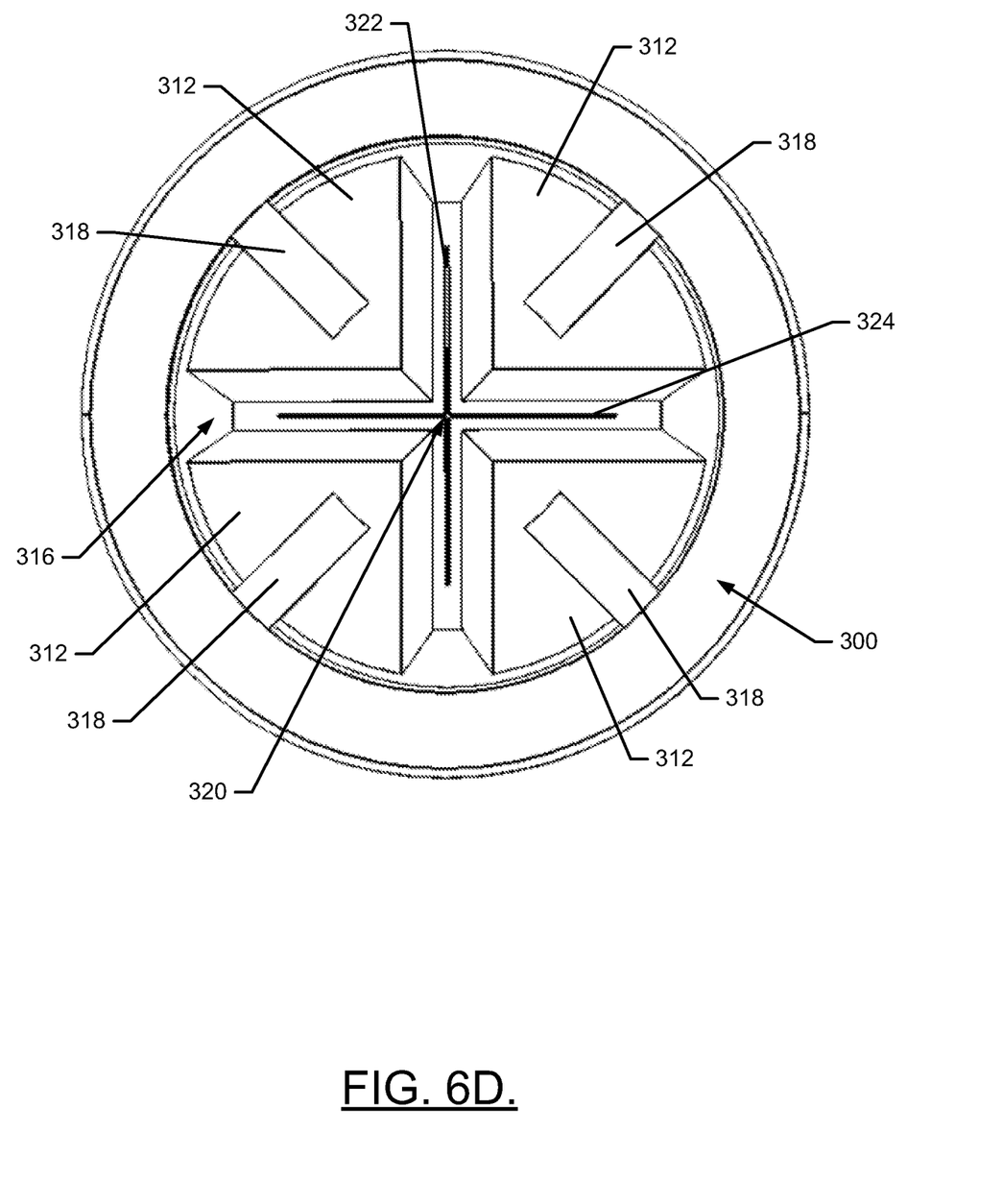
FIG. 6D is a rear view of the chalk port in accordance with an example embodiment.
Figure 7:
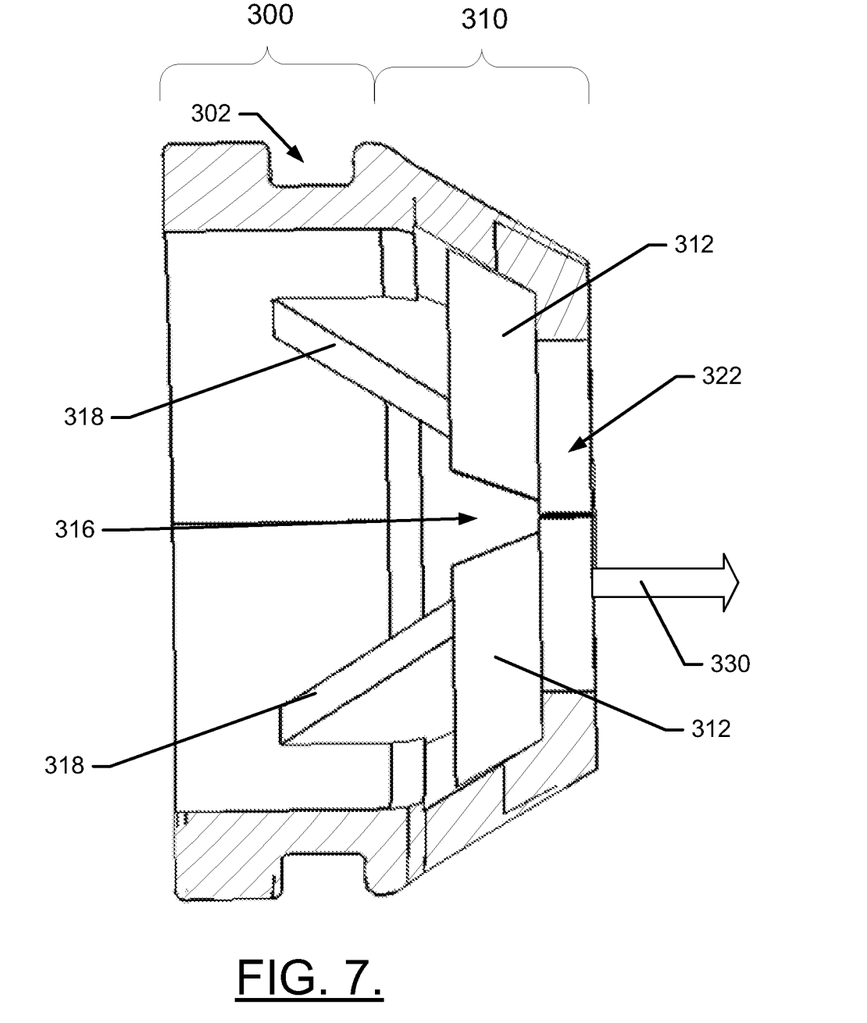
FIG. 7 illustrates a cross section view of the chalk port in accordance with an example embodiment.
Figure 8:
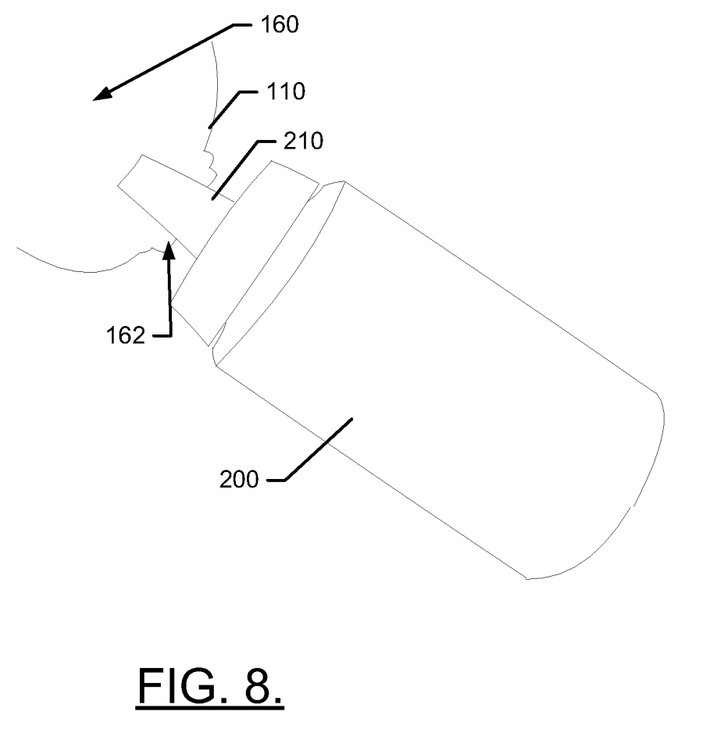
FIG. 8 illustrates a perspective view of a chalk bottle inserted through the chalk port in accordance with an example embodiment.

As indicated above, some example embodiments may relate to the provision of a chalk box that may have an improved chalk port design for reduced leakage, while improving ease of chalk refilling. This may be accomplished by providing an improved one-way valve design as described herein. FIG. 1 illustrates a block diagram of a chalk box 100 in accordance with an example embodiment, and FIGS. 2 and 3 illustrate front and rear perspective views, respectively, of the chalk box 100. FIG. 4 illustrates a cross section view taken along a plane passing through the intersection between case halves of the chalk box 100. FIG. 5 is a cross section view taken along a longitudinal centerline of the chalk box 100 via a plane that is perpendicular to the plane mentioned above in reference to FIG. 4. FIG. 6, which is defined by FIGS. 6A, 6B, 6C and 6D, illustrates various views of a one-way valve designed in accordance with an example embodiment. FIG. 7 shows the one-way valve in cross section, and FIG. 8 shows the one-way valve in use.

Of note, although FIGS. 2-5 illustrate a particular chalk box design that may work well with example one-way valve designs, it should be appreciated that the one-way valve design described herein can also be employed with any of a number of other chalk box designs. Thus, the chalk box design shown in FIGS. 2-5 is merely provided as an example to facilitate description of the operation of a chalk box generally, and to show how the one-way valve design described herein can also be advantageously employed in one example chalk box design.

Referring now to FIGS. 1-5, the chalk box 100 of an example embodiment may include a housing 110 comprising a first case half 112 and a second case half 114. The first and second case halves 112 and 114 may house a reel assembly 120 and a retraction assembly 130 therein. A string 140 (or line) may be wound onto the reel assembly 120 and may be alternately withdrawn from and retracted back onto the reel assembly 120. The retraction back onto the reel assembly 120 may be accomplished via the retraction assembly 130, which may include a foldable handle 132 that is folded in to nest into a portion of the second case half 114, and folded out in order to enable the user to turn the handle 132. When the handle 132 is folded out and turned, a hub 134 rotates and is operably coupled to a gear assembly (see gear assembly 136 of FIG. 5) that may provide multiple rotations of a drum or reel of the reel assembly 120 for each respective rotation of the handle 132.

The string 140 may be paid out through an aperture 150 formed in a portion of the housing 110. The aperture 150 may be formed to be slightly larger than a diameter of the string 140, and may further house or retain a filter or wiping member, such as a piece of felt or other material that prevents excess escape of chalk from a chalk reservoir 160 that is exposed to the string 140 while the string 140 is inside the housing 110, and also removes excess chalk from the string 140 as the string 140 is withdrawn from the housing 110. The felt may be held in place by a retaining wire or other structure. The string 140 may therefore pass through or be retained in the chalk reservoir 160 before passing out the aperture 150. In an example embodiment, the chalk reservoir 160 may include a chalk port 162 that is accessible from outside the housing 110 to be removed to enable refilling of the chalk reservoir 160. The chalk port 162 of this example is located at a bottom portion of the housing 110, but other locations for the chalk port 162 are also possible.

The string 140 has an end hook 170 disposed at one end thereof, and is affixed to the reel assembly 120 at the other end of the string 140. The end hook 170 may be affixed (temporarily) to an anchor point on a medium or surface that is to be marked. Once the end hook 170 is affixed to the anchor point, the string 140 may be paid out of the aperture 150 and unwound from the reel assembly 120. When a desired length of the string 140 has been paid out, the user can make any necessary markings by snapping or plucking the string 140 as described above. The end hook 170 may then be released from the anchor point, and the handle 132 may be used to operate the retraction assembly 130 to wind the string 140 back onto the reel assembly 120 by drawing the string 140 back into the housing 110 via the aperture 150.

Although the end hook 170 may dangle from the housing 110 near the aperture 150, some example embodiments may employ a seating assembly 180, which may be formed as a mouth or nozzle that includes a reception cavity 182 that is formed therein to allow the end hook 170 to be withdrawn into the reception cavity 182. When the end hook 170 is withdrawn into the reception cavity 182, the end hook 170 may be seated flush with the distal end (relative to the remainder of the housing 110) of the seating assembly 180. In other words, the end hook 170 is fully seated in a portion of the housing 110 (specifically in the reception cavity 182 of the seating assembly 180) such that substantially all of the body, back, base or spine of the end hook 170 is received or surrounded by the reception cavity 182 and only the teeth or prongs (which extend at about a 90 degree angle to the body, back, base or spine) are outside the reception cavity 182. This arrangement, if employed, may ensure that the end hook 170 cannot be inadvertently snagged or caught on objects, clothing and/or the like, but also creates a sleek and aesthetically pleasing appearance.

As can be appreciated from FIGS. 1-5, and as shown explicitly in FIG. 8, the chalk port 162 may be used for refilling the chalk reservoir 160 via a chalk bottle 200. In particular, a nozzle 210 of the chalk bottle 200 may be inserted into the chalk port 162 and thereby access the chalk reservoir 160 within the housing 110. In particular, the chalk port 162 may be configured to open to receive the nozzle 210 so that squeezing of the chalk bottle 200 transfers chalk from the chalk bottle 200 through the nozzle 210 and into the chalk reservoir 160. In this regard, the physical presence of the nozzle 210 and movement of the nozzle 210 inwardly into the housing 110 may cause portions of the chalk port 162 to separate (as described in greater detail below) to permit entry of the nozzle 210 through the chalk port 162 without any further action on the part of the user. Thereafter, upon withdrawal of the nozzle 210 of the chalk bottle 200 from the chalk port 162, the same portions of the chalk port 162 that separated to permit entry of the nozzle 210 will close and self-seal in order to prevent leakage of chalk from the chalk reservoir 160 (i.e., through the chalk port 162). Again, the user need not take any action beyond the withdrawal of the nozzle 210. As will be discussed in greater detail below, several design features of the chalk port 162 make the chalk port 162 very effective in sealing the chalk reservoir to prevent leakage, but also providing the easy access described above. These design features will now be described in greater detail in reference to FIGS. 6 and 7.

Referring to FIGS. 6 and 7, various structural details of the configuration of the chalk port 162 of an example embodiment will be discussed. In this regard, the chalk port 162 may include an interface portion 300 that operably couples the chalk port 162 to the housing 110, and a tapered portion 310. The interface portion 300 may be a substantially annular (or ring shaped) portion that has a relatively smooth or continuous internal periphery of a fixed diameter. The interface portion may also have a relatively smooth or continuous external periphery of a fixed diameter with the exception of an external groove 302. The external groove 302 may be formed along an axial length of the external periphery of the interface portion 300 to allow a lip or protrusion of the housing 110 to fit therein to retain the chalk port 162 in connection with the housing 110 during either insertion or removal of the nozzle 210 of the chalk bottle 200, and also at other times during use of the chalk box 100.

The tapered portion 310 may be adjacent to the interface portion 300 and extend from one end of the interface portion 300 along an axial direction. A diameter of the tapered portion 310 may decrease as distance from the interface portion 300 increases. In the pictured example, the diameter of the external periphery of the tapered portion 310 may linearly decrease as distance from the interface portion 300 increases. However, other rates of change in diameter may be employed in other cases.

Although an external periphery of the tapered portion 310 may initially be smooth and continuous (i.e., proximate to the interface portion 300), the external periphery of the tapered portion 310 may include discontinuities due to the formation of projections 312 that are formed to extend inwardly toward the axis of the chalk port 162. From the rear perspective (see FIGS. 6B and 6C) the projections 312 are discontinuities in the external periphery of the tapered portion 310. In this regard, the projections 312 appear as pie shaped recesses 313 in the external periphery of the tapered portion 310. The pie shaped recesses 313 each have retaining walls 314 formed on axially extending edges thereof.

From the front perspective (see FIGS. 6A and 6D), the projections 312 appear as pie shaped platforms that are substantially symmetrically formed in opposing quadrants. A cross shaped (or plus sign-shaped) slot 316 may be formed to separate each of the projections 312 from each other. Referring back to FIGS. 6B and 6C, the slot 316 appears as a cross (or plus sign-shaped) projection that extends axially away from the interface portion 300 from the rear of the chalk port 162, and which is formed by the combination of all of the retaining walls 314. The slot 316 may be formed by sidewalls (i.e., sidewalls of the projections 312) that are formed at about a 20 degree angle relative to the axis of the chalk port 162.

In an example embodiment, each of the projections 312 may be supported by a respective rib 318. The ribs 318 may each have a triangular shaped cross section when viewed from a plane passing therethrough parallel to the axis of the chalk port 162. Each of the ribs 318 may extend from the interface portion 300 to the tapered portion 310 by having one leg of the triangle shaped cross section physically attached to the internal periphery of the interface portion 300 and the other leg of the triangle shaped cross section physically attached to a surface of a corresponding one of the projections 312 that faces toward the interface portion 300. A hypotenuse of the triangle shaped cross section extends inwardly toward the axis of the chalk port 162 at an angle (e.g., about 45 degrees) relative to the axis. Thus, each of the ribs 318 may be disposed spaced apart from each other by 90 degrees within the inner periphery of the interface portion 300. Accordingly, the ribs 318 may extend inwardly at an angle that bisects the angle between each of the projections 312.

Extending along a center of each of the arms of the recess 314, a plus shaped slit assembly 320 may be formed. The slit assembly 320 may include a first slit 322 that extends radially outwardly from the axis of the chalk port 162 in a first direction, and a second slit 324 that extends radially outwardly from the axis of the chalk port 162 in a second direction that is substantially perpendicular to the first direction. As such, the slit assembly 320 (and more particularly the first and second slits 322 and 324) may be configured in a cross-slit arrangement. The slit assembly 320 is generally closed and is biased closed under normal circumstances. Only responsive to insertion of an object into the slit assembly 320 is the biasing (provided by the structures of the chalk port 162) overcome in order to open the slit assembly 320. As such, it can be appreciated that when the projections 312 are in a rest position (i.e., the position shown in FIGS. 6A, 6B, 6C and 6D), the slit assembly 320 is held closed.

The chalk port 162 may be molded as a single piece from a material that is suitable for molding, and yet has properties of resilience and flexibility. Thus, the chalk port 162 may be molded from silicone mold rubber, polyurethane mold rubber, or any of a number of elastomers or other materials having similar properties. After molding as a single piece including all of the structures described above except for the slit assembly 320, the slit assembly 320 may be cleanly die cut into the chalk port 162. Accordingly, it can be appreciated that cutting the slit assembly 320 in this fashion will prevent any burrs from forming that may compromise the sealing capability of the chalk port 162. To the contrary, when the chalk port 162 is inserted into the housing 110, the external groove 302 may be slightly compressed by the housing 110 thereby causing the tapered portion 310 to also be under a compression to bias the slit assembly 320 closed. Chalk is generally therefore retained in the chalk reservoir 160 with relatively little (if any) leakage occurring through the slit assembly 320.

Meanwhile, when the nozzle 210 is inserted into the chalk port 162 in the manner shown in FIG. 8, the distal end of the nozzle 210 may impact the projections 312 and/or the ribs 318. The impact may force the projections 312 to move axially inwardly (relative to the interior of the housing 110) in a direction shown by arrow 330 in FIG. 7 and simultaneously moving radially outwardly due to flexing of the tapered region 310 to accommodate the insertion of the nozzle 210. The movement of the projections 312 in this way separates the projections 312 from each other and opens up the slit assembly 320 to enable the nozzle 210 to pass therethrough. However, the movement of the projections 312 in this way also creates a compression force on the retaining walls 314 that biases the slit assembly 320 back toward the closed position. Meanwhile, the ribs 318 are each also under tension (i.e., by being stretched out along the hypotenuse thereof) when the projections 312 are displaced from the rest position. Thus, movement of the projections 312 out of the rest position causes forces on both opposing sides of the slit assembly 320 (i.e., the ribs 318 on the outside surface of the slit assembly 320 and the retaining walls 314 on the inside surface of the slit assembly 320) to be applied to bias the slit assembly 320 toward the closed position. This biasing both quickly closes the slit assembly 320 when the nozzle 210 is withdrawn and maintains the slit assembly 320 tightly closed thereafter. Accordingly, example embodiments provide for a relatively high egress rating for the chalk port 162 and provide for minimal leakage of chalk out of the chalk port 162 before, during and after chalk refilling operations.

The chalk port 162, and the structures thereof that have been described above, could be manufactured to a number of different sizes. However, one example embodiment may have an axial length of about 12 mm and a radial (external) diameter of about 21.4 mm. The diameter may be about 19 mm at the external groove 302 meaning that the depth of the external groove 302 may be about 0.7 mm. The external groove 302 may have a width of about 2.4 mm, and may be located about 3 mm from the end of the interface portion 300 that is opposite the tapered portion 310. The tapered portion 310 may taper inwardly at about a 60 degree angle and the height (in the axial direction) of the retaining walls 314 may be about 2.5 mm. Width of the slots 316 may be about 3 mm at the narrowest point thereof. The ribs 318 may have a width of about 1.5 mm and lengths of each of the legs thereof may be about 4.23 mm. A length of each of the first and second slits 322 and 324 may be about 10 mm, and a length of the base of the slots 316 (through which the slits 322/324 are cut) may be about 12.7 mm.

In an example embodiment, a chalk box is provided. The chalk box may include a housing having an aperture, a reel assembly enclosed within the housing, a string having a first end operably coupled to an end hook and configured to extend from the housing through the aperture and having a second end configured to be wound on the reel assembly, a chalk reservoir in which the string is retained or through which the string passes prior to extending out of the aperture, and a chalk port of an example embodiment. The chalk port may include an interface portion configured to interface with the housing of the chalk box to retain the chalk port in contact with the chalk box, a tapered portion extending away from the interface portion in an axial direction, and a slit assembly disposed at the tapered portion. The tapered portion may have a diameter that reduces as distance from the interface portion increases. The tapered portion may include a plurality of projections separated from each other by slits of the slit assembly. The projections may have a rest position configured to bias the slit assembly closed. Ribs may be formed to extend between the interface portion and the projections to bias the projections to the rest position. The chalk box may therefore be filled with chalk faster and with less mess than had been previously possible.

In some embodiments, the features of the device described above may be augmented or modified, or additional features may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, the diameter of the tapered portion decreases linearly as distance from the interface portion increases. In an example embodiment, the slit assembly may include a first slit extending in a first radial direction and a second slit extending in a second radial direction that is substantially perpendicular to the first radial direction. In some cases, the first and second slits may meet at respective centers thereof at an axis of the chalk port, and the first and second slits may separate four projections from each other. In an example embodiment, the projections may extend toward the interface portion to form recesses on a side of the tapered portion facing away from the interface portion, and the recesses may be bounded by retaining walls. In some cases, the retaining walls may bias the slit assembly toward the closed position from an opposite side of the slit assembly relative to the ribs. In an example embodiment, the ribs may have a triangular shape with a first leg of the triangular shape attached to an internal periphery of the interface portion and a second leg of the triangular shape attached to a side of a corresponding one of the projections that faces toward the interface portion. In some cases, a hypotenuse of the triangular shape may extend at an angle (e.g., 45 degrees) relative to an axis of the chalk port. In an example embodiment, the interface portion and the tapered portion may combine to form a one-way valve for entry of chalk into the chalk reservoir, and the slit assembly may be biased toward a closed position by forces exerted on an outside and inside of the slit assembly. In some cases, a cross shaped slot may be formed between the projections.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A chalk port that permits refilling into a chalk reservoir of a chalk box and inhibit chalk leakage from the cha reservoir, the chalk port comprising:
    an interface portion configured to interface with a housing of the chalk box to retain the chalk port in contact with the chalk box;
    a tapered portion extending away from the interface portion in an axial direction, the tapered portion having a diameter that reduces as distance from the interface portion increases; and
    a slit assembly disposed at the tapered portion,
    wherein the tapered portion comprises a plurality of projections separated from each other by slits of the slit assembly,
    wherein the projections have a rest position configured to bias the slit assembly closed, and wherein ribs are formed to extend between the interface portion and the projections to bias the projections to the rest position.

2. The chalk port of claim 1, wherein the interface portion comprises an external groove configured to receive a housing protrusion or housing lip to retain the chalk port in connection with the housing of the chalk box:
wherein the diameter of the tapered portion decreases linearly as distance from the interface portion increases.

3. The chalk port of claim 1, wherein the slit assembly comprises a first slit extending in a first radial direction and a second slit extending in a second radial direction that is substantially perpendicular to the first radial direction.

4. The chalk port of claim 3, wherein the first and second slits meet at respective centers thereof at an axis of the chalk port, and wherein the first and second slits separate four projections from each other.

5. The chalk port of claim 1, wherein the ribs have a triangular shape with a first leg of the triangular shape attached to an internal periphery of the interface portion and a second leg of the triangular shape attached to a side of a corresponding one of the projections that faces toward the interface portion.

6. The chalk port of claim 5, wherein a hypotenuse of the triangular shape extends at an angle relative to an axis of the chalk port, and wherein the angle is about 45 degrees.

7. The chalk port of claim 1, wherein the interface portion and the tapered portion combine to form a one-way valve that permits refilling into the chalk reservoir and inhibits chalk leakage from the chalk reservoir, and wherein the slit assembly is biased toward a closed position by forces exerted on an outside and inside of the slit assembly.

8. The chalk port of claim 1, wherein a cross shaped slot is formed between retaining walls of the projections to separate the training walls that extend axially from sides of the projections that face toward the interface portion to a base of the cross shaped slot;
wherein the slits of the slit assembly are cut through the base of the cross shaped slot,
wherein the retaining walls bias the slit assembly toward the closed position from an opposite side of the slit assembly relative to the ribs.

9. A chalk port for retaining chalk within a chalk reservoir of a chalk box, the chalk port comprising:
an interface portion configured to interface with a housing of the chalk box to retain the chalk port in contact with the chalk box;
a tapered portion extending away from interface portion in an axial direction, the tapered portion having a diameter that reduces as distance from the interface portion increases, and
a slit assembly disposed at the tapered portion,
wherein the tapered portion comprises a plurality of projections separated from each other by slits of the slit assembly,
wherein the projections have a rest position configured to bias the slit assembly closed, and
wherein the ribs are formed to extend between the interface portion and the projections to bias the projections to the rest position,
wherein the slit assembly comprises a first slit extending in a first radial direction and a second slit extending in a second radial direction that is substantially perpendicular to the first radial direction,
wherein the first and second slits meet at respective centers thereof at an axis of the chalk port, and wherein the first and second slits separate from each other,
wherein the projections extend toward the interface portion forming recesses on a side of the tapered portion facing away from the interface portion, and
wherein the recesses are bounded by retaining walls.

10. The chalk port of claim 9, wherein the retaining walls bias the slit assembly toward the closed position from an opposite side of the slit assembly relative to the ribs.

11. A chalk box comprising:
a housing having an aperture;
a reel assembly enclosed within the housing;
a string having a first end operably coupled to an end hook and configured to extend from the housing through the aperture and having a second end configured to be wound on the reel assembly;
a chalk reservoir in which the string is retained or through which the string passes prior to extending out of the aperture; and
a chalk port that permits chalk refilling into the chalk reservoir and inhibits chalk leakage from the chalk reservoir, the chalk port comprising:
an interface portion configured to interface with the housing of the chalk box to retain the chalk port in contact with the chalk box;
a tapered portion extending away from the interface portion in an axial direction, the tapered portion having a diameter that reduces as distance from the interface portion increases; and
a slit assembly disposed at the tapered portion,
wherein the tapered portion comprises a plurality of projections separated from each other by slits of the slit assembly,
wherein the projections have a rest position configured to bias the slit assembly closed, and
wherein ribs are formed to extend between the interface portion and the projections to bias the projections to the rest position.

12. The chalk box of claim 11, wherein the diameter of the tapered portion decreases linearly as distance from the interface portion increases.

13. The chalk box of claim 11, wherein the slit assembly comprises a first slit extending in a first radial direction and a second slit extending in a second radial direction that is substantially perpendicular to the first radial direction.

14. The chalk box of claim 13, wherein the first and second slits meet at respective centers thereof at an axis of the chalk port, and wherein the first and second slits separate four projections from each other.

15. The chalk box of claim 14, wherein the projections extend toward the interface portion forming recesses on a side of the tapered portion facing away from the interface portion, and
wherein the recesses are bounded by retaining walls.

16. The chalk box of claim 15, wherein the retaining walls bias the slit assembly toward the closed position from an opposite side of the slit assembly relative to the ribs.

17. The chalk box of claim 11, wherein the ribs have a triangular shape with a first leg of the triangular shape attached to an internal periphery of the interface portion and a second leg of the triangular shape attached to a side of a corresponding one of the projections that faces toward the interface portion.

18. The chalk box of claim 17, wherein a hypotenuse of the triangular shape extends at an angle relative to an axis of the chalk port, and wherein the angle is about 45 degrees.

19. The chalk box of claim 11, wherein the interface portion and the tapered portion combine to form a one-way valve for entry of chalk into the chalk reservoir, and wherein the slit assembly is biased toward a closed position by forces exerted on an outside and inside of the slit assembly.

20. The chalk box of claim 11, wherein a cross shaped slot is formed between the projections.

* * * * *

UNITED STATES PATENT AND TRADEMARK OFFICE
CERTIFICATE OF CORRECTION

| | | |
|---|---|---|
| PATENT NO. | : 12,259,049 B2 | Page 1 of 1 |
| APPLICATION NO. | : 17/618950 | |
| DATED | : March 25, 2025 | |
| INVENTOR(S) | : Cecil Wilson | |

It is certified that error appears in the above-identified patent and that said Letters Patent is hereby corrected as shown below:

In the Claims

In Column 8, Claim 1, Line 53, "the cha" should read as -- the chalk --

In Column 9, Claim 2, Line 7, "chalk box:" should read as -- chalk box; --

In Column 10, Claim 9, Line 3, "separate from" should read as -- separate four projections from --

Signed and Sealed this
Twenty-fourth Day of June, 2025

Coke Morgan Stewart
*Acting Director of the United States Patent and Trademark Office*